United States Patent [19]

Takeda et al.

[11] Patent Number: 5,206,337

[45] Date of Patent: Apr. 27, 1993

[54] SOLVENT-SOLUBLE POLYIMIDESILOXANE OLIGOMER AND PROCESS FOR PRODUCING THE SAME

[75] Inventors: Toshiro Takeda; Naoshige Takeda, both of Yokohama; Akira Tokoh, Tokyo, all of Japan

[73] Assignee: Sumitomo Bakelite Company Limited, Tokyo, Japan

[21] Appl. No.: 696,647

[22] Filed: May 7, 1991

[30] Foreign Application Priority Data

| May 10, 1990 | [JP] | Japan | 2-118772 |
| May 14, 1990 | [JP] | Japan | 2-121174 |
| Jun. 5, 1990 | [JP] | Japan | 2-145289 |
| Jun. 8, 1990 | [JP] | Japan | 2-148776 |
| Jun. 8, 1990 | [JP] | Japan | 2-148777 |
| Jun. 8, 1990 | [JP] | Japan | 2-148778 |
| Jun. 25, 1990 | [JP] | Japan | 2-164044 |

[51] Int. Cl.⁵ ............ C08G 69/08; C07D 323/04; C07F 7/04; C07F 7/08
[52] U.S. Cl. ............ 528/313; 528/315; 528/320; 549/214; 556/425
[58] Field of Search ............ 528/26, 128, 313, 315, 528/320; 556/425; 549/214

[56] References Cited

U.S. PATENT DOCUMENTS

| 3,553,282 | 1/1971 | Holub et al. | 556/415 |
| 4,520,075 | 5/1985 | Igarashi et al. | 528/128 |
| 4,535,099 | 8/1985 | Raymond et al. | 521/154 |
| 4,586,997 | 5/1986 | Chung et al. | 525/426 |
| 4,670,497 | 6/1987 | Yutaka et al. | 524/119 |

Primary Examiner—José G. Dees
Assistant Examiner—Joseph M. Conrad
Attorney, Agent, or Firm—Browdy and Neimark

[57] ABSTRACT

The present invention provides an oligomer having an inherent viscosity $\eta$ of 0.001–0.5 dl/g as measured at a concentration of 0.5 g/dl in N-methyl-2-pyrrolidone at 30° C., which has been obtained by subjecting to polymerization and imidization (a) an acid component consisting of an aromatic tetracarboxylic acid dianhydride and/or a derivative thereof and (b) a diamine component consisting of 5–100 mole % of a diaminosiloxane represented by the undermentioned formula (I) and 95–0 mole % of an organic diamine other than the formula (I):

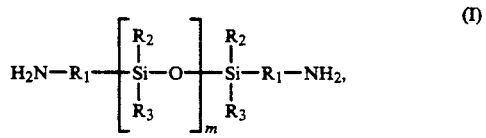

wherein $R_1$ is a divalent aliphatic group of 1–5 carbon atoms or a divalent aromatic group of 6 or more carbon atoms; $R_2$ and $R_3$ are each a monovalent aliphatic or aromatic group and may be the same or different; and m is an integer of 1–100, as well as an oligomer solution obtained by dissolving the above oligomer in an organic solvent.

20 Claims, No Drawings

SOLVENT-SOLUBLE POLYIMIDESILOXANE OLIGOMER AND PROCESS FOR PRODUCING THE SAME

The present invention relates to a solvent-soluble polyimidesiloxane oligomer having good heat resistance, excellent moldability and excellent workability, a solution containing the same, and a process for producing the same.

Polyimide resins, being excellent in heat resistance, abrasion resistance, electrical insulating property, film formability, flexibility, mechanical properties, etc., have conventionally been used as an electronic device material, an electrical insulating material, a covering material, a coating, a molded product, a laminate, a fiber or film material, etc. The polyimide resins excluding those of thermosetting type such as bismaleimide resin, however, are not necessarily satisfactory in moldability and workability.

One reason for the above drawbacks commonly possessed by linear polyimide resins is that their solubility in a solvent is significantly reduced by the formation of imide rings in the main chain. Hence, it is current practice to dissolve a polyamic acid (a polyimide precursor) in an organic solvent of high polarity (e.g., N-methyl-2-pyrrolidone) to prepare a polyimide precursor varnish. Even when a polyimide precursor is used in the form of such a varnish, the upper limit of the varnish viscosity is specified in view of the moldability and workability of the varnish. Meanwhile, the polyamic acid in the varnish gives sharp viscosity increase as the resin concentration in the varnish becomes higher. Therefore, the resin concentration in the varnish has been at most about 30% in most cases. A number of attempts have been made to allow the varnish to have a low viscosity and a high resin concentration simultaneously. These attempts include, for example, use of a resin of lower molecular weight, esterification of a polyamic acid to reduce the interaction between the polyamic acid molecules due to hydrogen bond, use of a solvent-soluble polyimide, and a combination of the above approaches. However, the second and third approaches merely give a resin concentration of at most 40%, and the first approach (use of a resin of lower molecular weight) can give a resin concentration of 50% or more but, because of the lower molecular weight of the resin used, merely gives a polyimide resin of poor flexibility and is unable to provide a polyimide resin satisfactory in mechanical properties, electrical properties, heat resistance, etc. Thus, in order for the final molded article to have satisfactory properties, it has been necessary to allow the resin in a varnish to have a molecular weight of a certain level or higher and resultantly to reduce the resin concentration in the varnish in order to obtain good workability. This has allowed the final molded article to contain voids and pinholes caused by the vaporization of a large amount of the varnish solvent or by the water generated in association with imide ring formation.

In order to eliminate these drawbacks, various attempts have been made. U.S. Pat. Nos. 4,586,997 and 4,670,497 disclose resins having imide rings which have been made soluble in solvents such as diglyme (diethylene glycol dimethyl ether) which have relatively low polarity and a boiling point of 180° C. or less. These resins are polyimidesiloxanes containing a certain diether dianhydride, and are soluble in diglyme and slightly soluble in tetrahydrofuran. Each of these polyimidesiloxanes, however, has a relatively low glass transition temperature of 125°–150° C., making difficult its use at high temperature of 200° C. or more.

Various organic acid dianhydrides have been used for the production of soluble polyimidesiloxanes. Some of these acid dianhydrides are described in the following patent applications.

U.S. patent application No. 239,372 filed on Sep. 1, 1988 as a continuation-in-part application of U.S. patent application No. 32,722 filed on Mar. 31, 1987 describes that a completely imidized polyimidesiloxane produced from oxydiphthalic acid anhydride is soluble in solvents such as diglyme, tetrahydrofuran and methyl ethyl ketone.

U.S. patent application No. 154,168 filed on Feb. 9, 1988 discloses that an almost completely imidized polyimidesiloxane produced from a mixture of biphenyltetracarboxylic acid dianhydride and benzophenonetetracarboxylic acid dianhydride is soluble in solvents such as diglyme, tetrahydrofuran and methyl ethyl ketone.

U.S. patent application No. 153,898 filed on Feb. 9, 1988 discloses that an almost completely imidized polyimidesiloxane produced from a mixture of bis(dicarboxyphenyl)hexafluoropropane dianhydride and another acid dianhydride is soluble in solvents such as diglyme, tetrahydrofuran and methyl ethyl ketone.

U.S. patent application No. 205,412 filed on Jun. 10, 1988 discloses that an almost completely imidized polyimidesiloxane produced from sulfadiphthalic acid anhydride is soluble in solvents such as diglyme, tetrahydrofuran and methyl ethyl ketone.

U.S. Pat. No. 4,535,099 discloses a polyimide produced by reacting an organic tetracarboxylic acid or a derivative thereof with a mixture of an aromatic diamine and an amine-terminated silicone. The literature mentions, as an appropriate aromatic diamine, diaminopyridine which is a (diprimary monotertiary)-amine having two primary nitrogen atoms and one tertiary nitrogen atom. The literature also mentions that the above polyimide is particularly useful for production of a soft foam.

U.S. Pat. No. 3,553,282 discloses production of a polyamic acid containing 2,6-diaminopyridine. This patent makes no suggestion on the production process for a completely imidized solvent-soluble polyimidesiloxane. More specifically, the patent makes no suggestion on the process for producing a completely imidized but still solvent-soluble polyimidesiloxane from 2,6-diaminopyridine and a dianhydride such as BTDA or 6FDA.

U.S. patent application No. 270,920 filed on Nov. 14, 1988 discloses that a completely imidized polyimidesiloxane produced from diaminotrifluoromethylpyridine is soluble in solvents such as diglyme and the like.

Though these U.S. Pat. Nos. or U.S. patent applications relate to solvent-soluble polyimidesiloxanes, they make substantially no disclosure on production process of the polymer, give no specific limits for polymerization degree and molecular weight of the polymer, and importantly, make no description on that these polyimidesiloxanes give a useful method for enhancement of resin concentration.

In view of such circumstances, it is an object of the present invention to provide a polyimidesiloxane oligomer capable of giving a resin having excellent moldability and workability without impairing mechanical properties, electrical properties, heat resistance and other properties, and provide a solution containing the same, and moreover provide a process for producing the same.

The present invention provides an oligomer having an inherent viscosity η of 0.001-0.5 dl/g as measured at a concentration of 0.5 g/dl in N-methyl-2-pyrrolidone at 30° C., which has been obtained by subjecting to polymerization and imidization (a) an acid component consisting of an aromatic tetracarboxylic acid dianhydride and/or a derivative thereof and (b) a diamine component consisting of 5-100 mole % of a diaminosiloxane represented by the undermentioned formula (I) and 95-0 mole % of an organic diamine other than the formula (I):

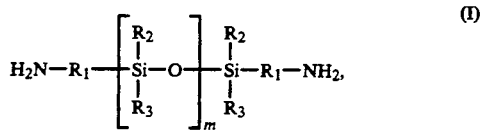

wherein $R_1$ is a divalent aliphatic group of 1-5 carbon atoms or a divalent aromatic group of 6 or more carbon atoms; $R_2$ and $R_3$ are each a monovalent aliphatic or aromatic group and may be the same or different; and m is an integer of 1-100.

Preferable embodiments of the above oligomer are as follows.

(1) The oligomer according to the above, wherein 5 mole % or more of the aromatic tetracarboxylic acid dianhydride is 3,3',4,4'-benzophenonetetracarboxylic acid dianhydride.

(2) The oligomer according to the above, wherein the acid component is a mixture of 3,3'-oxydiphthalic acid anhydride and 2,2-bis(3,4-dicarboxyphenyl)-hexafluoropropane dianhydride and the molar ratio in the mixture is 90/10 to 10/90.

(3) The oligomer according to the above, wherein 10 mole % or more of the diamine component consists of the diaminosiloxane of the formula (I) and, as the organic diamine, an alkyl-substituted aromatic diamine represented by the following formula (II):

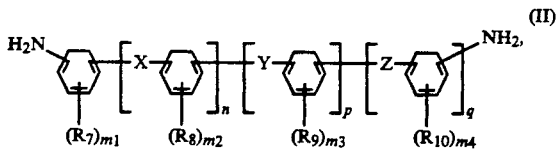

wherein $R_7$ to $R_{10}$ are each an alkyl group of 1-4 carbon atoms; X, Y and Z are each —O—,

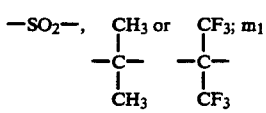

is an integer of 1-4; $m_2$, $m_3$ and $m_4$ are each an integer of 0 to 4; and n, p and q are each an integer of 0 to 10, and the molar ratio (I)/(II) is 50/50 to 100/0.

(4) The oligomer according to (3) above, wherein the alkyl-substituted aromatic diamine is 2,4-diaminotoluene.

(5) The oligomer according to (3) above, wherein the alkyl-substituted aromatic diamine is 2,6-diaminotoluene.

(6) The oligomer according to (3) above, wherein the alkyl-substituted aromatic diamine is 2,2-bis[4-(4-aminophenoxy)phenyl]propane.

(7) The oligomer according to the above, wherein 10 mole % or more of the diamine component consists of the diaminosiloxane of the formula (I) and a diaminopyridine represented by the undermentioned formula (III) and the molar ratio (I)/(III) is 50/50 to 100/0.

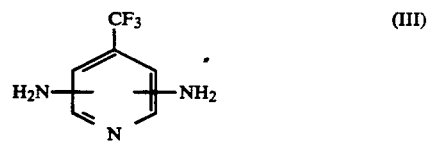

(8) The oligomer according to the above, wherein a part or the whole of the diaminosiloxane represented by the formula (I) has been reacted with the acid dianhydride at a molar ratio, [acid dianhydride]/[diaminosiloxane] of at least 2.

(9) The oligomer according to the above, wherein the imidization degree of the oligomer is 80-100%.

The present invention also provides an oligomer solution obtained by dissolving the above oligomer in an organic solvent.

As the organic solvent, there are preferred diethylene glycol dimethyl ether, triethylene glycol dimethyl ether, N-methyl-2-pyrrolidone, N,N-dimethyl-acetamide, tetrahydrofuran, methyl ethyl ketone, dioxane and chlorinated hydrocarbons.

The present inventors carried out extensive study over many years in order to develop a heatresistant resin which can be made into a varnish of high resin concentration but still of low viscosity and having excellent workability, and which can give a molded article excellent in heat resistance, mechanical properties, electrical properties, etc. As a result, it was found that a solvent-soluble polyimidesiloxane oligomer obtained by subjecting (a) an acid component containing a particular aromatic tetracarboxylic acid dianhydride and/or a derivative thereof and (b) an amine component containing a particular diaminosiloxane, to polymerization and imidization, can be made into a varnish of high resin concentration but still of low viscosity by dissolving in an organic solvent, and that heat treatment of the varnish in processing it into a final molded article gives significant increase in the molecular weight of the oligomer, and allows the molded article to have excellent flexibility, heat resistance, mechanical properties and electrical properties. This finding has led to the completion of the present invention.

The acid component used in the present invention is an aromatic tetracarboxylic acid dianhydride and/or a derivative thereof, but is preferably (a) a mixture containing 5 mole % or more of 3,3',4,4'-benzophenonetetracarboxylic acid dianhydride and/or a derivative thereof or (b) a mixture consisting of 3,3'-oxydiphthalic acid anhdyride and 2,2-bis(3,4-dicarboxyphenyl)hexafluoropropane dianhydride wherein the molar ratio of the two components is 90/10 to 10/90.

When the content of 3,3',4,4'-benzophenonetetracarboxylic acid dianhydride and/or a derivative thereof in the acid component is less than 5 mole %, the low-molecular weight polymer obtained by reaction of said acid component with a particular diaminosiloxane and an organic diamine gives no sufficient increase in molecular weight when subjected to heat treatment for molding, making it difficult to obtain a final molded article having excellent flexibility, mechanical properties, etc.

The mixture of 3,3'-oxydiphthalic acid anhydride and 2,2-bis(3,4-dicarboxyphenyl)hexafluoropropane dianhydride, when reacted with a particular diaminosiloxane and an organic diamine, can provide a low-molecular weight polymer having excellent flexibility, heat resistance, mechanical properties and electrical properties. However, when either one of the two acid anhydrides is present in a proportion larger than 90 mole %, it is difficult to allow the resulting low-molecular weight polymer to have good balance in organic solvent solubility and heat resistance. Specifically speaking, when the proportion of 3,3'-oxydiphthalic acid anhydride in the mixture (the acid component) exceeds 90 mole %, the low-molecular weight polymer obtained by reacting the mixture with a particular diaminosiloxane and an organic diamine gives a cured product having a glass transition temperature of 200° C. or more, but the organic solvent usable in dissolving the polymer is restricted to those of high polarity and high boiling point, such as N-methyl-2-pyrrolidone and the like. When the proportion of 2,2-bis(3,4-dicarboxyphenyl)-hexafluoropropane dianhydride in the acid component exceeds 90 mole %, the low-molecular weight polymer obtained by reacting the mixture with a particular diaminosiloxane and an organic diamine has good solubility in organic solvents and is soluble even in solvents having a boiling point of 100° C. or less, but it is difficult to allow the cured product obtained from the polymer to have a glass transition temperature of 200° C. or more.

As the derivative of 3,3',4,4'-benzophenonetetracarboxylic acid dianhydride, there can be used reaction products between 3,3',4,4'-benzophenonetetracarboxylic acid dianhydride and various alcohols. The type of the alcohols is not restricted. It is of course that in the present invention, besides the above-mentioned preferable acids, there can also be used one or more other acids in a proportion of less than 95 mole % based on the total acid component.

Non-restrictive examples of the acid component usable in the present invention are pyromellitic acid dianhydride, 2,2',3,3'-benzophenonetetracarboxylic acid dianhydride, 2,3,3',4'-benzophenonetetracarboxylic acid dianhydride, naphthalen-2,3,6,7-tetracarboxylic acid dianhydride, naphthalen-1,2,5,6-tetracarboxylic acid dianhydride, naphthalen-1,2,4,5-tetracarboyxlic acid dianhydride, naphthalen-1,4,5,8-tetracarboxylic acid dianhydride, naphthalen-1,2,6,7-tetracarboxylic acid dianhydirde, 4,8-dimethyl-1,2,3,5,6,7-hexahydronaphthalen-1,2,5,6-tetracarboxylic acid dianhydride, 4,8-dimethyl-1,2,3,5,6,7-hexahydronaphthalen-2,3,6,7-tetracarboxylic acid dianhydride, 2,6-dichloronaphthalen-1,4,5,8-tetracarboxylic acid dianhydride, 2,7-dichloronaphthalen-1,4,5,8-tetracarboxylic acid dianhydride, 2,3,6,7-tetrachloronaphthalen-1,4,5,8-tetracarboxylic acid dianhydride, 1,4,5,8-tetrachloronaphthalen-2,3,6,7-tetracarboxylic acid dianhydride, 3,3',4,4'-diphenyltetracarboxylic acid dianhydride, 2,2',3,3'-diphenyltetracarboxylic acid dianhydride, 2,3,3',4'-diphenyltetracarboxylic acid dianhydride, 3,3'',4,4''-p-terphenyltetracarboxylic acid dianhydride, 2,2'',3,3''-p-terphenyltetracarboxylic acid dianhydride, 2,3,3'',4''-p-terphenyltetracarboxylic acid dianhydride, 2,2-bis-(2,3-dicarboxyphenyl)propane dianhydride, 2,2-bis(3,4-dicarboxyphenyl)propane dianhydride, bis(2,3-dicarboxyphenyl) ether dianhydride, bis(3,4-dicarboxyphenyl)ether dianhydride, bis(2,3-dicarboxyphenyl)methane dianhydride, bis(3,4-dicarboxyphenyl)methane dianhydride, bis(2,3-dicarboxyphenyl)sulfone dianhydride, bis(3,4-dicarboxyphenyl)sulfone dianhydride, 1,1-bis(2,3-dicarboxyphenyl)-ethane dianhydride, 1,1-bis(3,4-dicarboxyphenyl)ethane dianhydride, perylene-2,3,8,9-tetracarboxylic acid dianhydride, perylene-3,4,9,10-tetracarboxylic acid dianhydride, perylene-4,5,10,11-tetracarboxylic acid dianhydride, perylene-5,6,11,12-tetracarboxylic acid dianhydride, phenanthrene-1,2,7,8-tetracarboxylic acid dianhydride, phenanthrene-1,2,6,7-tetracarboxylic acid dianhydride, phenanthrene-1,2,9,10-tetracarboxylic acid dianhydride, cyclopentane-1,2,3,4-tetracarboxylic acid dianhydride, pyrazine-2,3,5,6-tetracarboxylic acid dianhydride, pyrrolidine-2,3,4,5-tetracarboxylic acid dianhydride, and thiophene-2,3,4,5-tetracarboxylic acid dianhydride.

In carrying out the present invention, it is necessary that the diaminosiloxane represented by the following formula (I) be present in a proportion of 5 mole % or more in the total diamine components:

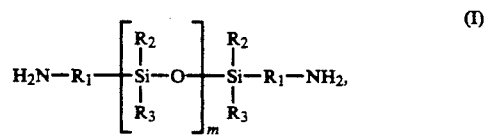

wherein $R_1$ is a divalent aliphatic group of 1–5 carbon atoms or a divalent aromatic group of 6 or more carbon atoms; $R_2$ and $R_3$ are each a monovalent aliphatic or aromatic group and may be the same or different; and m is an integer of 1–100.

When the proportion of the diaminosiloxane is less than 5 mole %, the low-molecular weight polymer obtained by reacting it with a particular tetracarboxylic acid dianhydride or a derivative thereof gives no sufficient increase in molecular weight when subjected to heat treatment for molding, making it impossible to obtain a final cured product having excellent flexibility and mechanical properties. The polymerization degree m of the diaminosiloxane represented by the formula (I) is required to be 1–100. A polymerization degree m larger than 100 gives a polarity so much different from that of imide ring, causing phase separation; thereby, the polymerization reaction between the acid component and the diamine component is not completed with a part of the diaminosiloxane remaining unreacted, or the resulting polyimidosiloxane oligomer is not uniformly soluble in organic solvents; as a result, the final molded article has low mechanical properties, electrical properties, heat resistance, etc.

Preferably, the diamine component used in the present invention contains 10 mole % or more of a diaminosiloxane represented by the formula (I) and an alkyl-substituted aromatic diamine represented by the formula (II), with the molar ratio of (I)/(II) being 50/50 to 100/0. The alkyl-substituted aromatic diamine is preferably 2,4-diaminotoluene, 2,6-diaminotoluene, 2,2-bis[4-(4-aminophenoxy)phenyl]propane, or the like. Other alkyl-substituted aromatic diamines can also be used, such as 3,3'-dimethylbenzidine, m-xylene-2,5-diamine, paraxylene-2,5-diamine and the like.

It is also preferable that the diamine component used in the present invention contains 10 mole % or more of a diaminosiloxane represented by the formula (I) and a diaminopyridine represented by the formula (III), with the molar ratio of (I)/(III) being 50/50 to 100/0.

In the present invention, at least one diamine compound other than the diamines of the formulas (I), (II) and (III) can also be used alone or in combination in an amount not exceeding a given proportion. Non-restrictive examples of the diamine compound include m-phenylene-diamine, 1-isopropyl-2,4-phenylene-diamine, p-phenylene-diamine, 4,4'-diamino-diphenylpropane, 3,3'-diamino-diphenylpropane, 4,4'-diamino-diphenylethane, 3,3'-diamino-diphenylethane, 4,4'-diamino-diphenylmethane, 3,3'-diamino-diphenylmethane, 4,4'-diamino-diphenylsulfide, 3,3'-diamino-diphenyl sulfide, 4,4'-diamino-diphenylsulfone, 3,3'-diamino-diphenylsulfone, 4,4'-diamino-diphenyl ether, 3,3'-diamino-diphenyl ether, benzidine, 3,3'-diaminobiphenyl, 3,3'-dimethoxybenzidine, 4,4''-diamino-p-terphenyl, 3,3''-diamino-p-terphenyl, bis(p-amino-cyclohexyl)methane, bis(p-$\beta$-amino-t-butylphenyl)ether, bis(p-$\beta$-methyl-$\delta$-aminopentyl)benzene, p-bis(2-methyl-4-amino-pentyl)-benzene, p-bis(1,1-dimethyl-5-amino-pentyl)benzene, 1,5-diamino-naphthalene, 2,6-diamino-naphthalene, 2,4-bis($\beta$-amino-t-butyl)toluene, m-xylylene-diamine, p-xylylenediamine, 2,5-diamino-1,3,4-oxadiazole, 1,4-diamino-cyclohexane, piperazine, methylene-diamine, ethylene-diamine, propylene-diamine, 2,2-dimethylpropylene-diamine, tetramethylene-diamine, pentamethylene-diamine, hexamethylene-diamine, 2,5-dimethyl-hexamethylene-diamine, 3-methoxy-hexamethylene-diamine, heptamethylene-diamine, 2,5-dimethyl-heptamethylene-diamine, 3-methylheptamethylene-diamine, 4,4-dimethylheptamethylene-diamine, octamethylene-diamine, nonamethylene-diamine, 5-methylnonamethylene-diamine, 2,5-dimethylnonamethylene-diamine, decamethylene-diamine, 1,10-diamino-1,10-dimethyl-decane, 2,11-diamino-dodecane, 1,12-diaminooctadecane, 2,12-diamino-octadecane, 2,17-diamino-eicosane, etc.

The present solvent-soluble polyimidesiloxane oligomer, when made into a varnish, is required to have a low viscosity and a high resin concentration in view of the moldability and workability mentioned hereinbefore. In order for the oligomer to satisfy the above requirement, the oligomer must have an inherent viscosity $\eta$ of 0.001-0.5 as measured at 30° C. for a N-methyl-2-pyrrolidone solution containing 0.5 g/dl of the oligomer. When the inherent viscosity $\eta$ of the oligomer is higher than 0.5, the resin concentration in the oligomer solution whose viscosity has been specified at, for example, 100 poises or less as measured at 25° C. by a B type rotational viscometer, is about 25%, making it necessary to evaporate the solvent occupying a large portion (about 75%) of the solution, before heat treatment for obtaining a final cured product; this generates voids and pinholes in the cured product and allows the stress caused by volume shrinkage to remain in the cured product. When the inherent viscosity $\eta$ of the oligomer is smaller than 0.001, it is impossible to obtain, during the heat treatment, sufficient increase in molecular weight, i.e., a final molecular weight required to give a sufficient mechanical strength; or, in order to obtain a required final molecular weight, there is required in the heat treatment a long time which makes the heat treatment inappropriate for industrial application.

The solvent-soluble polyimidesiloxane oligomer of the present invention has an inherent viscosity $\eta$ of 0.001–0.5 dl/g and is obtained from a low-molecular weight polyamid acid or a derivative thereof. The method for producing a low-molecular weight polyamic acid or a derivative thereof includes (1) use of an acid component and an amine component both as a reactant, in a equivalent ratio deviating from 1.0, (2) use of a monofunctional acid component or amine component which can act as an end terminator, and (3) carrying out the reaction in the presence of water or at a relatively high temperature of 50° C. or more.

In the polyimidesiloxane oligomer of the present invention, it is desirable that at least 80% of the imidizable components have been imidized. The polyimide precursors, i.e., a polyamic acid, a polyamic acid ester and a derivative thereof produce water, alcohols, etc. as by-products when they are imidized to form an imide ring. These volatile components remain in a final molded product in undesirable amounts to form voids and pinholes or cause opening of imide ring to induce molecular weight reduction. The polyimidesiloxane oligomer having an imidization degree of 80% or more is substantially free from the above problems and gives a good molded product.

Generally polyimide precursors tend to show, in varnish state, property changes with time, particularly viscosity reduction due to moisture absorption and the resultant decomposition into lower molecular weight and, to prevent it, must be stored at room temperature or below, particularly at 5° C. or below. However, the polyimidosiloxane oligomer having an imidization degree of 80% or more shows no property change with time and accordingly can be stored at room temperature.

The present polyimidesiloxane oligomer is used in a solution dissolved in an organic solvent. In this case, the oligomer is desirably dissolved uniformly in an organic solvent in a resin concentration of 40% or more, in view of the moldability and workability.

When the resin concentration is less than 40%, the molded article obtained tends to form voids and pinholes and have residual stress, as mentioned above. When the oligomer solution is not uniform, there arise phase separation, reduction in mechanical strength of the resulting molded article, cloudy appearance of the molded article, etc. The organic solvent used for dissolving the polyimidosiloxane oligomer is desirably selected from diethylene glycol dimethyl ether, triethylene glycol dimethyl ether, N-methyl-2-pyrrolidone, N,N-dimethylacetamide, $\gamma$-butyrolactone, tetrahydrofuran, methyl ethyl ketone, dioxane and chlorinated hydrocarbons. Besides these, a poor solvent can be used as a vaporization-controlling agent, a film-levelling agent or the like, in an amount which enables the uniform dissolution of the oligomer.

In producing the polyimidesiloxane oligomer of the present invention, it is preferable that a part or the whole of the diaminosiloxane represented by the formula (I) has been reacted with the acid dianhydride at a molar ratio, [acid dianhydride]/[diaminosiloxane] of at least 2. As a result, an acid-terminated siloxane compound of the following formula (IV) is obtained:

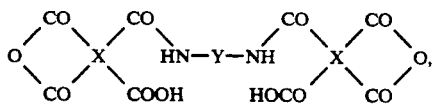  (IV)

wherein X is

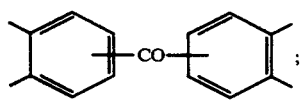

Y is 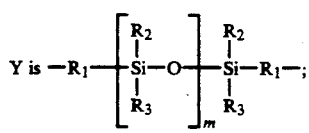

$R_1$ is a divalent aliphatic group of 1–5 carbon atoms or a divalent aromatic group of 6 or more carbon atoms; $R_2$ and $R_3$ are each a monovalent aliphatic or aromatic group and may be the same or different; and m is an integer of 1–100.

The reason for using the above procedure in the production of the polyimidesiloxane oligomer is that the preliminary reaction of the diaminosiloxane with a part of at least two equivalents of the acid dianhydride enables disappearance of the both of terminal amino groups of the diaminosiloxane and that the subsequent reaction of the resultant acid anhydride-terminated siloxane and the remaining acid dianhydride with the remaining diamine component enables uniform dispersion of the siloxane component in the resulting resin main-chain. In other words, the reaction of the diaminosiloxane itself and another organic diamine with the acid dianhydride, introduces independently the diaminosiloxane component in the resin main-chain in the initial or later period of polymerization, when the reactivity of the diaminosiloxane with the acid dianhydride differs from the reactivity of another organic diamine with the acid dianhydride. That is, the preliminary treatment of the terminals of the diaminosiloxane with the acid dianhydride incurs no such introduction and enables uniform dispersion of the siloxane component in the resin main-chain.

This uniform dispersion of the siloxane component in the resin main-chain can provide a cured product having excellent heat resistance, electrical properties, mechanical properties and flexibility. Meanwhile, non-uniform introduction of the siloxane component in the resin main-chain brings about inconveniences such as microscopic phase separation and the resultant reduction in organic solvent solubility, opaque cured product and reduction in mechanical properties, and the like.

According to another aspect of the present invention, even when requirement for flexibility is low and no siloxane component is necessary, there can be obtained an oligomer having good properties and excellent workability by use of an acid component containing 50 mole % or more of 3,3',4,4'-benzophenonetetracarboxylic acid dianhydride and/or a derivative thereof and an amine component containing 50 mole % or more of an alkyl-substituted aromatic diamine represented by the general formula (II).

The polyimidesiloxane oligomer of the present invention can be used in the following specific applications.

The present polyimidesiloxane oligomer can be firstly used in various electronic devices as a surface protective film or as a heat-resistant insulating film on which multi-layered wiring is made. Such electronic devices include electronic circuit devices such as semiconductor, transistor, linear IC, hybrid IC, luminescent diode, LSI, VLSI and the like. The present polyimidesiloxane oligomer can also be used as an electroconductive paste by adding an electroconductive filler such as silver or the like.

Besides, the present polyimidesiloxane oligomer can be used as a high temperature-resistant coating varnish for dip coating of electric wire, magnet wire and various electrical parts as well as for protective coating of metal parts. The polyimidesiloxane oligomer can be further used as an impregnating varnish for impregnation of glass cloth, fused quartz cloth, graphite fiber, carbon fiber and boron fiber, the impregnated cloths and fibers being used in ladar dome, printed wiring board, radioactive waste container, turbine blade, space ship of high temperature resistance and excellent electrical properties, and other structural parts, and also used, for shielding of microwave or radioactive rays, as a waveguide in computers, etc. or as an interior material in nuclear apparatuses and X-ray apparatuses.

Further, the present polyimidesiloxane oligomer can be used as a molding material for production of sliding surfaces of self-lubricating type in piston ring, seat of a valve, bearing, seal and the like, by adding graphite powder, graphite fiber, molybdenum disulfide or poly-(ethylene tetrafluoride); or for production of jet engine parts, molded structural parts of high strength, etc. by adding glass fiber, graphite fiber, carbon fiber or boron fiber.

The present invention is hereinafter illustrated specifically by way of Examples.

EXAMPLE 1

32.22 g (0.1 mole) of 3,3',4,4'-benzophenonetetracarboxylic acid dianhydride was dissolved in 240 g of N-methyl-2-pyrrolidone in a four-necked separable flask provided with a thermometer, a stirrer, a starting material-feeding inlet and a dry nitrogen gas-feeding tube. To the resulting solution was dropwise added 42.09 g (0.05 mole) of a diaminosiloxane of the following formula,

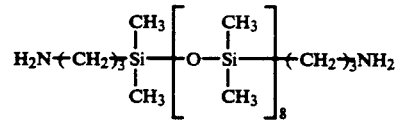

in one hour by means of a dropping funnel to carry out reaction slowly. After the completion of the dropwise addition, the mixture was stirred for one hour. Throughout the above procedure, dry nitrogen gas was passed through the reaction system, and the system was maintained at 20° C. by cooling with an ice bath. To the resulting system was added 7.33 g (0.06 mole) of 2,4-diaminotoluene, and stirring was effected for 5 hours while 20° C. was maintained, to complete the reaction. 72 g of toluene was added to the resulting system. The dry nitrogen gas-feeding tube was removed and, instead, a Dean-Stark reflux condenser was fitted. Further, the ice bath was replaced by an oil bath. The system was heated using the oil bath to effect imidization at 150°–170° C. while the water generated by imidization was removed out of the system by azeotropy with toluene, and the reaction was completed in 5 hours after water generation had ceased. The resulting polyimide varnish was dropwise added to 30 l of pure water in one hour with stirring, to precipitate a resin. The resin was collected by filtration to recover as a solid. The solid was dried in a dryer at 120° C. for 3 hours.

The resulting polyimide resin was measured for spectrum by FT-IR. Determination of imidization from the absorption at 1650 cm$^{-1}$ based on the amide bond of polyamic acid before imidization and the absorption at 1780 cm$^{-1}$ of imide ring, confirmed that the polyimide resin had been imidized 100%. The polyimide resin was also measured for inherent viscosity $\eta$ at 30° C. in a concentration of 0.5 g/dl in N-methyl-2-pyrrolidone and the viscosity was 0.10. A solution obtained by dissolving the polyimide resin in diglyme (diethylene glycol dimethyl ether) so as to give a resin concentration of 45%, gave a viscosity of 80 poises when measured by a B type rotational viscometer.

The above polyimide varnish was coated on a glass plate by means of an applicator; the resulting film was dried at 80° C., 150° C. and 200° C. each for 30 minutes to prepare a film having a final thickness of 100 mm; the film was peeled from the glass plate. A part of the film was redissolved in N-methyl-2-pyrrolidone to measure its inherent viscosity $\eta$. The inherent viscosity increased to 1.18. The film was observed using a microscope, but no pinholes, voids, etc. were seen. A tensile test was conducted for the film, which gave a strength of 5.0 kg/mm$^2$ and an elongation of 120%. Further, a thermogravimetric analysis was effected at a temperature elevation rate of 5° C./min, in which the film showed a decomposition starting temperature of 350° C.

EXAMPLES 2–5 AND COMPARATIVE EXAMPLES 1–3

Polyimide varnishes were obtained in the same manner as in Example 1 except that there were used different compositions for starting materials, different imidization degrees, and different solvents and resin concentrations in polyimide varnishes. The results are shown in Table 1.

COMPARATIVE EXAMPLE 4

In a separable flask of the same type as in Example 1 were placed 42.09 g (0.05 mole) of a diaminosiloxane of the following formula,

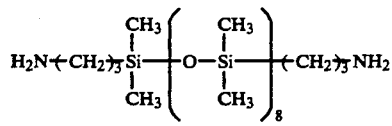

7.33 g (0.06 mole) of 2,4-diaminotoluene and 240 g of N-methyl-2-pyrrolidone, and they were made into a solution. Thereto was added 32.22 g (0.1 mole) of 3,3',4,4'-benzophenonetetracarboxylic acid dianhydride in powder state. Throughout the above procedure, dry nitrogen gas was passed through the system, the system was maintained at 20° C. by cooling with an ice bath, and stirring was carried out for 5 hours to complete the reaction. Then, 100 g of toluene was added to the resulting system. The dry nitrogen gas-feeding tube was removed and, instead, a Dean-Stark reflux condenser was fitted. Further, the ice bath was replaced by an oil bath. The system was heated using the oil bath to effect imidization at 150°–170° C. while the water generated by imidization was removed out of the system by azeotropy with toluene, and the reaction was completed in 5 hours after water generation had ceased. The subsequent procedure was carried out in the same as in Example 1, to obtain a polyimide varnish. The results are shown in Table 1.

TABLE 1

| | Composition of starting materials*[1] | | | | Polyimide varnish | | | Inherent viscosity $\eta$ | |
|---|---|---|---|---|---|---|---|---|---|
| | Acid(s) (molar ratio) | | Amines (molar ratio) | | Imidization (%) | Solvent used | Resin concentration (%) | Polyimide varnish (dl/g) | Film (dl/g) |
| Example | | | | | | | | | |
| 2 | ① BTDA*[2] (0.10) | | ② G$_9$*[3] ③ DATFP*[4] ③ TDA*[5] | (0.02) (0.045) (0.045) | 100 | Diglyme*[13] | 50 | 0.15 | 1.40 |
| 3 | ① 6FDA*[6] ① ODPA*[7] | (0.05) (0.05) | ② G$_9$ ③ TDA ③ DDE*[8] | (0.05) (0.03) (0.03) | 100 | Dioxane | 50 | 0.09 | 1.20 |
| 4 | ① BTDA ① BPDA*[9] ③ ODPA | (0.01) (0.02) (0.07) | ② G$_9$ ④ TDA | (0.01) (0.10) | 90 | Diglyme | 40 | 0.30 | 1.60 |
| 5 | ① ODPA ③ BTDA ③ PMDA*[10] | (0.05) (0.025) (0.025) | ② G$_9$ ④ DATFP ④ DMB*[11] ④ DDE | (0.007) (0.013) (0.05) (0.04) | 90 | Diglyme | 40 | 0.27 | 0.95 |

| | | 100 μm-thick film | | Tensile properties | | Glass transition |
|---|---|---|---|---|---|---|
| | | Pinholes | Voids | Strength (kgf/mm$^2$) | Elongation (%) | temperature (°C.) |
| | Example | | | | | |
| | 2 | Absent | Absent | 5.2 | 17 | 210 |
| | 3 | Absent | Absent | 3.8 | 20 | 205 |
| | 4 | Absent | Absent | 7.5 | 14 | 235 |
| | 5 | Absent | Absent | 11 | 8 | 250 |

| | Composition of starting materials*[1] | | Polyimide varnish | | | Inherent viscosity $\eta$ | |
|---|---|---|---|---|---|---|---|
| | Acid(s) (molar ratio) | Amines (molar ratio) | Imidization (%) | Solvent used | Resin concentration (%) | Polyimide varnish (dl/g) | Film (dl/g) |
| Comparative | | | | | | | |

TABLE 1-continued

| Example | | | | | | | | | |
|---|---|---|---|---|---|---|---|---|---|
| 1 | ① BTDA | (0.10) | ② G9 | (0.02) | 50 | N-methyl-2-pyrrolidone | 30 | 0.60 | 1.20 |
| | | | ③ TDA | (0.05) | | | | | |
| | | | ③ PPD*12 | (0.04) | | | | | |
| 2 | ① BTDA | (0.10) | ② G9 | (0.004) | 100 | N-methyl-2-pyrrolidone | 20 | 0.65 | 0.90 |
| | | | ③ TDA | (0.106) | | | | | |
| 3 | ① BPDA | (0.07) | ② G9 | (0.02) | 100 | N-methyl-2-pyrrolidone | 40 | 0.80 | 0.90 |
| | ① ODPA | (0.03) | ③ TDA | (0.09) | | | | | |
| 4 | ② BTDA | (0.10) | ① G9 | (0.05) | 100 | Diglyme | 30 | 0.60 | 0.60 |
| | | | ① TDA | (0.06) | | | | | |

| | 100 μm-thick film | | Tensile properties | | Glass transition |
|---|---|---|---|---|---|
| | Pinholes | Voids | Strength (kgf/mm²) | Elongation (%) | temperature (°C.) |
| Comparative Example | | | | | |
| 1 | Present | Present | 8.0 | 10 | 230 |
| 2 | Absent | Present | 10 | 8 | 260 |
| 3 | Absent | Present | 5.5 | 18 | 210 |
| 4 | Absent | Absent | 2.0 | 20 | 154 |

Notes for Table 1
*1The figures ①, ②, ③ and ④ refer to charging orders of acid(s) and amines.
*2 3,3',4,4'-Benzophenonetetracarboxylic acid dianhydride

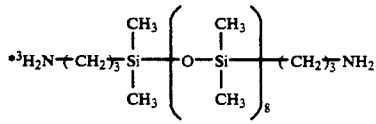

*3 (structure shown above)

*4 2,6-Diamino-4-trifluoromethylpyridine
*5 2,4-Diaminotoluene
*6 2,2-Bis(3,4-dicarboxyphenyl)hexafluoropropane dianhydride
*7 3,3'-Oxydiphthalic acid anhydride
*8 4,4'-Diaminodiphenyl ether
*9 3,3',4,4'-Biphenyltetracarboxylic acid dianhydride
*10 Pyromellitic acid dianhydride
*11 3,3'-Dimethylbenzidine
*12 Para-phenylenediamine
*13 Diethylene glycol dimethyl ether

EXAMPLES 6-10

Polyimide varnishes were obtained in the same manner as in Example 1 except that there were used different compositions for starting materials, different imidization degrees, and different solvents and resin concentrations in polyimide varnishes. The results are shown in Table 2.

We claim:
1. A low molecular weight polymer having an inherent viscosity η of 0.001–0.5 dl/g as measured at a concentration of 0.5 g/dl in N-methyl-2-pyrrolidone at 30° C. and having an imidization degree of 80–100%, which has been obtained by subjecting to polymerization and imidization (a) an acid component consisting of an aromatic tetracarboxylic acid dianhydride and/or a deriva-

TABLE 2

| | Composition of starting materials*1 | | | | Polyimide varnish | | |
|---|---|---|---|---|---|---|---|
| Example | Acid(s) (molar ratio) | | Amines (molar ratio) | | Imidization (%) | Solvent used | Resin concentration (%) |
| 6 | ① BTDA | (0.10) | ② G9 | (0.01) | 100 | γ-butyrolactone | 50 |
| | | | ③ 2,6TDA*14 | (0.10) | | | |
| 7 | ① BTDA | (0.10) | ② G9 | (0.04) | 100 | N,N-dimethylacetamide | 50 |
| | | | ③ BAPP*15 | (0.08) | | | |
| 8 | ① BTDA | (0.01) | ② G9 | (0.04) | 90 | Triglyme*16 THF*17 MEK*18 (1/1/1 = w/w/w) | 40 |
| | ① 6FDA | (0.09) | ③ DATFP | (0.04) | | | |
| | | | ③ TDA | (0.03) | | | |
| 9 | ① BTDA | (0.08) | ② G9 | (0.01) | 100 | Chloroform | 40 |
| | ① ODPA | (0.02) | ③ TDA | (0.08) | | | |
| | | | ③ DATFP | (0.02) | | | |
| 10 | ① BTDA | (0.04) | ② G9 | (0.08) | 100 | Dioxane | 55 |
| | ① BPDA | (0.06) | ③ TDA | (0.03) | | | |

| | Inherent viscosity η | | 100 μm-thick film | | Tensile properties | | Glass transition |
|---|---|---|---|---|---|---|---|
| Example | Polyimide varnish (dl/g) | Film (dl/g) | Pinholes | Voids | Strength (kgf/mm²) | Elongation (%) | temperature (°C.) |
| 6 | 0.20 | 1.55 | Absent | Absent | 10 | 17 | 260 |
| 7 | 0.15 | 1.00 | " | " | 2.7 | 18 | 210 |
| 8 | 0.30 | 1.60 | " | " | 3.5 | 25 | 220 |
| 9 | 0.35 | 0.85 | " | " | 8.0 | 8 | 240 |
| 10 | 0.07 | 0.80 | " | " | 2.5 | 83 | 195 |

*14 2,6-Diaminotoluene
*15 2,2-Bis[4-(4-aminophenoxy)phenyl]propane
*16 Triethylene glycol dimethyl ether
*17 Tetrahydrofuran
*18 Methyl ethyl ketone tive thereof and (b) a diamine component consisting of 5-100 mole % of a diaminosiloxane represented by the undermentioned formula (I) and 95-0 mole % of an organic diamine other than the formula (I):

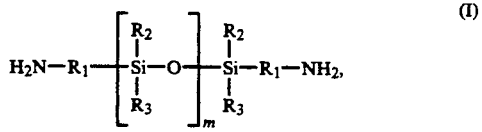

wherein $R_1$ is a divalent aliphatic group of 1-5 carbon atoms or a divalent aromatic group of 6 or more carbon atoms; $R_2$ and $R_3$ are each a monovalent aliphatic or aromatic group and may be the same or different; and m is an integer of 1-100.

2. A polymer according to claim 1, wherein 5 mole % or more of the aromatic tetracarboxylic acid dianhydride is 3,3',4,4'-benzophenonetetracarboxylic acid dianhydride.

3. A polymer according to claim 2, wherein a part or the whole of the diaminosiloxane represented by the formula (I) has been reacted with the acid dianhydride at a molar ratio of acid dianhydride to diaminosiloxane of at least 2.

4. A polymer solution obtained by dissolving the polymer according to claim 2, in an organic solvent.

5. A polymer according to claim 1, wherein the acid component is a mixture of 3,3'-oxydiphthalic acid anhydride and 2,2-bis(3,4-dicarboxyphenyl)hexafluoropropane dianhydride and the molar ratio in the mixture is 90/10 to 10/90.

6. A polymer according to claim 5, wherein a part or the whole of the diaminosiloxane represented by the formula (I) has been reacted with the acid dianhydride at a molar ratio of acid dianhydride to diaminosiloxane of at least 2.

7. A polymer according to claim 1, wherein 10 mole % or more of the diamine component consists of the diaminosiloxane of the formula (I) and, as the organic diamine, an alkyl-substituted aromatic diamine represented by the following formula (II):

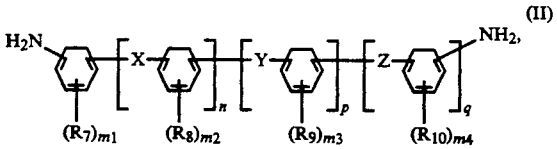

wherein $R_7$ to $R_{10}$ are each an alkyl group of 1-4 carbon atoms; X, Y and Z are each —O—,

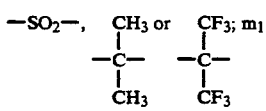

is an integer of 1-4; $m_2$, $m_3$ and $m_4$ are each an integer of 0 to 4; and n, p and q are each an integer of 0 to 10.

8. A polymer according to claim 7, wherein the molar ratio of the diaminosiloxane of the formula (I) and the alkyl-substituted aromatic diamine of the formula (II) is 50/50 to 100/0.

9. A polymer according to claim 8, wherein the alkyl-substituted aromatic diamine is 2,4-diaminotoluene or 2,6-diaminotoluene.

10. A polymer according to claim 8, wherein the alkyl-substituted aromatic diamine is 2,2-bis[4-(4-aminophenoxy) phenyl]propane.

11. A polymer according to claim 7, wherein the alkyl-substituted aromatic diamine is 2,4-diaminotoluene.

12. A polymer according to claim 7, wherein the alkyl-substituted aromatic diamine is 2,6-diaminotoluene.

13. A polymer according to claim 7, wherein the alkyl-substituted aromatic diamine is 2,2-bis[4-(4-aminophenoxy)phenyl]propane.

14. A polymer according to claim 1, wherein 10 mole % or more of the diamine component consists of the diaminosiloxane of the formula (I) and a diaminopyridine represented by the following formula (III).

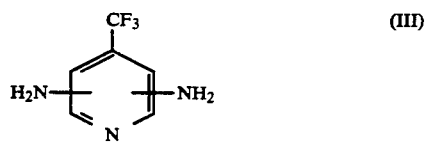

15. A polymer according to claim 14, wherein the molar ratio of the diaminosiloxane of the formula (I) and the diaminopyridine of the formula (III) is 50/50 to 100/0.

16. A polymer according to claim 1, wherein a part or the whole of the diaminosiloxane represented by the formula (I) has been reacted with the acid dianhydride at a molar ratio, [acid dianhydride]/ [diaminosiloxane] of at least 2.

17. A polymer solution obtained by dissolving the polymer according to claim 1 in an organic solvent.

18. A polymer solution according to claim 17, wherein the organic solvent is selected from the group consisting of diethylene glycol dimethyl ether, triethylene glycol dimethyl ether, N-methyl-2-pyrrolidone, N,N-dimethylacetamide, tetrahydrofuran, methyl ethyl ketone, dioxane and chlorinated hydrocarbons.

19. A polymer having an inherent viscosity $\eta$ of 0.001-0.5 dl/g as measured at a concentration of 0.5 g/dl in N-methyl-2-pyrrolidone at 30° C., which has been obtained by subjecting to polymerization and imidization (a) an acid component containing 50 mole % or more of 3,3',4,4'-benzophenone tetracarboxylic acid dianhydride and/or a derivative thereof and (b) a diamine component containing 50 mole % or more of an alkyl-substituted aromatic diamine represented by the following formula (II):

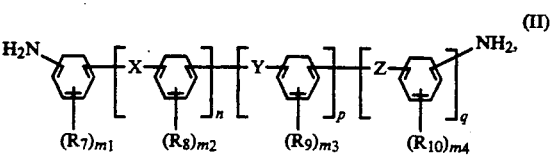

wherein $R_7$ to $R_{10}$ are each an alkyl group of 1-4 carbon atoms; X, Y and Z are each —O—,

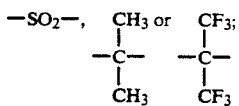

$m_1$ is an integer of 1–4; $m_2$, $m_3$ and $m_4$ are each an integer of 0 to 4; and n, p and q are each an integer of 0 to 10.

20. A low molecular weight polymer having an inherent viscosity $\eta$ of 0.001–0.5 dl/g as measured at a concentration of 0.5 g/dl in N-methyl-2-pyrrolidone at 30° C. and having an imidization degree of 80–100%, which has been obtained by subjecting to polymerization and imidization (a) an acid component consisting of an aromatic tetracarboxylic acid dianhydride and/or a derivative thereof and (b) a diamine component consisting of 5–100 mole % of a diaminosiloxane represented by the undermentioned formula (I) and 95–0 mole % of an organic diamine other than the formula (I):

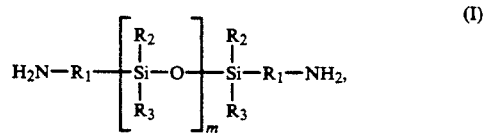

wherein $R_1$ is a divalent aliphatic group of 1–5 carbon atoms or a divalent aromatic group of 6 or more carbon atoms; $R_2$ and $R_3$ are each a monovalent aliphatic or aromatic group and may be the same or different; and m is an integer of 1–100;

wherein the alkyl-substituted aromatic diamine is 2,4-diaminotoluene, 2,6-diaminotoluene, or 2,2-bis[4-(4-aminophenoxy)phenyl]propane.

* * * * *